United States Patent
Kimura et al.

(10) Patent No.: US 10,294,542 B2
(45) Date of Patent: May 21, 2019

(54) METHOD FOR PRODUCING HIGH-STRENGTH GALVANIZED STEEL SHEET AND HIGH-STRENGTH GALVANNEALED STEEL SHEET

(71) Applicant: JFE STEEL CORPORATION, Tokyo (JP)

(72) Inventors: Hideyuki Kimura, Fukuyama (JP); Koichiro Fujita, Fukuyama (JP); Hiroshi Hasegawa, Fukuyama (JP)

(73) Assignee: JFE STEEL CORPORATION, Tokyo (JP)

( * ) Notice: Subject to any disclaimer, the term of this patent is extended or adjusted under 35 U.S.C. 154(b) by 389 days.

(21) Appl. No.: 15/305,557

(22) PCT Filed: Mar. 18, 2015

(86) PCT No.: PCT/JP2015/001526
§ 371 (c)(1),
(2) Date: Oct. 20, 2016

(87) PCT Pub. No.: WO2015/162849
PCT Pub. Date: Oct. 29, 2015

(65) Prior Publication Data
US 2017/0044640 A1 Feb. 16, 2017

(30) Foreign Application Priority Data

Apr. 22, 2014 (JP) .................. 2014-088044

(51) Int. Cl.
*C21D 9/46* (2006.01)
*C23C 2/02* (2006.01)
*C23C 2/06* (2006.01)
*C23C 2/28* (2006.01)
*C22C 38/00* (2006.01)
*B32B 15/01* (2006.01)
*C21D 6/00* (2006.01)
*C21D 8/02* (2006.01)
*C23C 2/40* (2006.01)
(Continued)

(52) U.S. Cl.
CPC ................ *C21D 9/46* (2013.01); *B32B 15/01* (2013.01); *B32B 15/013* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0273* (2013.01); *C21D 8/0284* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C23C 2/02* (2013.01); *C23C 2/06* (2013.01); *C23C 2/28* (2013.01); *C23C 2/40* (2013.01); *C23F 17/00* (2013.01); *C21D 2211/005* (2013.01); *C21D 2211/008* (2013.01)

(58) Field of Classification Search
CPC ...... C21D 9/46; C21D 8/0205; C21D 8/0226; C21D 8/0236; C21D 8/0273; C21D 6/002; C21D 6/005
See application file for complete search history.

(56) References Cited

U.S. PATENT DOCUMENTS 5,677,005 A 10/1997 Isobe et al.
8,389,128 B2 3/2013 Takagi et al.
(Continued)

FOREIGN PATENT DOCUMENTS

CN 101657558 A 2/2010
CN 101688277 A 3/2010
(Continued)

OTHER PUBLICATIONS

Chinese Office Action for Chinese Application No. 2015800209819, dated Jul. 13, 2017, including Concise Statement of Search Report, 9 pages.
(Continued)

*Primary Examiner* — Jessee R Roe
(74) *Attorney, Agent, or Firm* — RatnerPrestia

(57) ABSTRACT

A method is provided for producing a high-strength galvanized steel sheet having a microstructure that contains martensite in an area proportion of 20% or more and 60% or less and ferrite in an area proportion of 40% or more and 80% or less includes, in sequence, hot-rolling a steel slab containing a specific component composition, performing cold rolling, performing primary annealing, performing pickling, performing secondary annealing, and performing galvanizing treatment, in which in the primary annealing, heating is performed at an average heating rate of 0.1° C./sec. or more and less than 3° C./sec. in the temperature range of 600° C. to 750° C., an annealing temperature of 750° C. to 850° C. is maintained for 10 to 500 seconds, and then cooling is performed from the annealing temperature range to a cooling stop temperature of 600° C. or lower at an average cooling rate of 1 to 15° C./sec, in which in the pickling, the pickling weight loss of the steel sheet is 0.05 to 5 g/m² in terms of Fe, in which in the secondary annealing, an annealing temperature of 750° C. to 850° C. is maintained for 10 to 500 seconds, and then cooling is performed from the annealing temperature at an average cooling rate of 1 to 15° C./s, and in which after the galvanizing treatment, cooling is performed at an average cooling rate of 5 to 100° C./sec.

6 Claims, No Drawings

(51) Int. Cl.

| | |
|---|---|
| *C22C 38/02* | (2006.01) |
| *C22C 38/04* | (2006.01) |
| *C22C 38/06* | (2006.01) |
| *C22C 38/32* | (2006.01) |
| *C22C 38/22* | (2006.01) |
| *C22C 38/24* | (2006.01) |
| *C22C 38/26* | (2006.01) |
| *C22C 38/28* | (2006.01) |
| *C23F 17/00* | (2006.01) |

(56) References Cited

U.S. PATENT DOCUMENTS

| | | |
|---|---|---|
| 8,828,557 B2 | 9/2014 | Takagi et al. |
| 2013/0071687 A1 | 3/2013 | Takagi et al. |

FOREIGN PATENT DOCUMENTS

| | | |
|---|---|---|
| CN | 102414335 A | 4/2012 |
| CN | 103140594 A | 6/2013 |
| EP | 1041167 A1 | 10/2000 |
| EP | 2138599 A1 | 12/2009 |
| EP | 2184374 A1 | 5/2010 |
| EP | 2426230 A1 | 3/2012 |
| EP | 2623622 A1 | 8/2013 |
| JP | 2587724 | 3/1997 |
| JP | 2000290730 A | 10/2000 |
| JP | 2001207235 | 7/2001 |
| JP | 2004263271 A | 9/2004 |
| JP | 3956550 | 8/2007 |
| JP | 3997931 B2 | 10/2007 |
| JP | 2009035818 A | 2/2009 |
| JP | 2009209384 | 9/2009 |
| JP | 2013076148 A | 4/2013 |

OTHER PUBLICATIONS

Supplementary European Search Report for Application No. EP 15783160.3, dated Feb. 1, 2017, 13 pages.

International Search Report and Written Opinion for International Application No. PCT/JP2015/001526, dated Jun. 9, 2015, 4 pages.

Chinese Office Action for Chinese Application No. 201580020981.9, dated Jan. 24, 2018, including Concise Statement of Relevance of Office Action, 7 pages.

METHOD FOR PRODUCING HIGH-STRENGTH GALVANIZED STEEL SHEET AND HIGH-STRENGTH GALVANNEALED STEEL SHEET

CROSS REFERENCE TO RELATED APPLICATIONS

This is the U.S. National Phase application of PCT International Application No. PCT/JP2015/001526, filed Mar. 18, 2015, and claims priority to Japanese Patent Application No. 2014-088044, filed Apr. 22, 2014, the disclosures of each of these applications being incorporated herein by reference in their entireties for all purposes.

TECHNICAL FIELD

The present invention relates to methods for producing a high-strength galvanized steel sheet and a high-strength galvannealed steel sheet, the high-strength galvanized steel sheet and the high-strength galvannealed steel sheet each having good appearance of a coated surface suitable for automotive members and having good uniformity in material properties in the longitudinal direction of a coil.

BACKGROUND ART

In recently years, improvement in the fuel economy of automobiles has recently been required to regulate the amount of $CO_2$ emission from the viewpoint of global environment conservation. In addition, it is also required to improve safety by focusing on collision characteristics of automobile bodies in order to ensure the safety of passengers in case of accident. Thus, a reduction in the weight of automobile bodies and an increase in the strength of automobile bodies are being actively promoted.

To achieve both of the reduction in the weight and the increase in the strengthening of automobile bodies, an increase in the strength of a material for members to the extent that rigidity is not impaired and a reduction in weight by reducing the thickness of sheets are said to be effective. Nowadays, high-strength steel sheets are positively used for automotive parts. Steel sheets used for structural members and reinforcing members for automobiles each have a tensile strength (TS) of 780 MPa or more and even 980 MPa or more. The transformation strengthening is effective in increasing the strength of steel sheets. Multiple phase steel sheets composed of soft ferrite and hard martensite have good ductility and a good strength-ductility balance and thus have relatively good press formability. However, in multiple phase steel sheets, changes in conditions, such as annealing temperatures, in production in common continuous annealing lines cause significant variations in material properties, such as tensile strength (TS), so that the material properties are liable to vary in the longitudinal direction of coils. In this case, it is difficult to stably performing press forming in continuous press lines, thereby seemingly causing a significant reduction in workability. To ensure the amount of martensite required for strengthening, the amounts of C, Mn, and so forth are increased in multiple phase steel sheets. Mn is a more oxidizable element than Fe. Thus, in the production of galvanized steel sheets and galvannealed steel sheets with high Mn contents, ensuring wettability is problematic. Specifically, Mn in steel is selectively oxidized even in a non-oxidizing atmosphere or reducing atmosphere used in a common annealing furnace, concentrated on a surface to form an oxide, thereby reducing wettability with molten zinc at the time of coating treatment and possibly causing an uncoated portion.

In contrast, Patent Literature 1 discloses a method for improving wettability with molten zinc, the method including heating a steel sheet in an oxidizing atmosphere in advance to rapidly form an Fe oxide film on a surface at an oxidation rate of a predetermined rate or more and to inhibit the oxidation of added elements on a surface of a steel sheet, and then performing the reduction annealing of the Fe oxide film. However, in the case of a large amount of the steel sheet oxidized, iron oxide can adhere to a hearth roll to disadvantageously cause pressing flaws on the steel sheet. Patent Literature 2 discloses a method in which after annealing, a steel sheet is subjected to pickling to remove an oxide on its surfaces, annealing again, and galvanizing. However, Patent Literature 2 states a 590 MPa grade steel sheet, but contains no description of a steel sheet having a tensile strength (TS) of 780 MPa or more. Furthermore, Patent Literature 2 contains no description of elongation properties and variations in material properties serving as indices of press formability.

CITATION LIST

Patent Literature

[PTL 1] Japanese Patent No. 2587724
[PTL 2] Japanese Patent No. 3956550

SUMMARY OF INVENTION

Technical Problem

Typically, a high-strength steel sheet having a tensile strength (TS) of 780 MPa or more contain large amounts of alloying elements in order to increase the strength. Thus, variations in annealing conditions in a typical continuous annealing line cause the amounts of martensite and so forth in the steel sheet to be changed. This is liable to cause large variations in material properties, such as strength and elongation, in a coil, in particular, in the longitudinal direction of the coil. In this case, it is difficult to stably perform press forming in a continuous press line for automobiles, thereby significantly reducing workability. For this reason, the minimization of the variations in material properties, in other words, uniformity in material properties in the longitudinal direction of the coil, is strongly required.

The present invention has been accomplished in light of the foregoing circumstances. It is an object of the present invention to provide methods for producing a high-strength galvanized steel sheet and a high-strength galvannealed steel sheet containing C, Mn, and so forth, having good surface appearance, good uniformity in material properties in the longitudinal direction of a coil, and a tensile strength (TS) of 780 MPa or more.

Solution to Problem

To develop a high-strength steel sheet used for structural members for automobiles, the inventors have conducted intensive studies on various factors for strengthening, variations in material properties, and surface appearance of various thin steel sheets and have found that in the case of a steel sheet containing C and Mn, primary annealing conditions are appropriately controlled, a surface oxide is removed by pickling, and then secondary annealing is performed to produce a high-strength galvanized steel sheet having good surface appearance, a tensile strength (TS) of 780 MPa or more and preferably 980 MPa or more, and good uniformity in material properties in the longitudinal direction of a coil.

The gist of the present invention is described below.

[1] A method for producing a high-strength galvanized steel sheet having a microstructure that contains martensite in an area proportion of 20% or more and 60% or less and ferrite in an area proportion of 40% or more and 80% or less includes, in sequence, hot-rolling a steel slab containing, on a mass percent basis, 0.05% or more and less than 0.12% of C, 0.01% or more and less than 0.35% of Si, 2.2% or more and 3.5% or less of Mn, 0.001% or more and 0.050% or less of P, 0.010% or less of S, 0.005% or more and 0.100% or less of sol. Al, 0.0001% or more and 0.0060% or less of N, 0.010% or more and 0.080% or less of Nb, 0.010% or more and 0.080% or less of Ti, and the balance being Fe and incidental impurities; performing cold rolling; performing primary annealing; performing pickling; performing secondary annealing; and performing galvanizing treatment, in which in the primary annealing, heating is performed at an average heating rate of 0.1° C./sec. or more and less than 3° C./sec. in the temperature range of 600° C. to 750° C., an annealing temperature of 750° C. to 850° C. is maintained for 10 to 500 seconds, and then cooling is performed from the annealing temperature range to a cooling stop temperature of 600° C. or lower at an average cooling rate of 1 to 15° C./sec, in which in the pickling, the pickling weight loss of a steel sheet is 0.05 to 5 g/m$^2$ in terms of Fe, in which in the secondary annealing, an annealing temperature of 750° C. to 850° C. is maintained for 10 to 500 seconds, and then cooling is performed from the annealing temperature at an average cooling rate of 1 to 15° C./sec, and in which after the galvanizing treatment, cooling is performed at an average cooling rate of 5 to 100° C./sec.

[2] In the method for producing a high-strength galvanized steel sheet described in item [1], the high-strength galvanized steel sheet further contains, on a mass percent basis, one or more selected from 0.05% or more and 1.0% or less of Mo, 0.02% or more and 0.50% or less of V, 0.05% or more and 1.0% or less of Cr, and 0.0001% or more and 0.0030% or less of B in addition to the foregoing component composition.

[3] In the method for producing a high-strength galvanized steel sheet described in item [1] or [2], cooling is started within 3 seconds after the completion of finish rolling in the hot rolling, the cooling is performed in the temperature range of a finish rolling temperature in the hot rolling to (the finish rolling temperature—100° C.) at an average cooling rate of 5 to 200° C./sec, coiling is performed at 450° C. to 650° C., and then the cold rolling is performed at a rolling reduction of 40% or more.

[4] A method for producing a high-strength galvannealed steel sheet having a microstructure that contains martensite in an area proportion of 20% or more and 60% or less and ferrite in an area proportion of 40% or more and 80% or less includes, after the galvanizing treatment in the method for producing a high-strength galvanized steel sheet described in any one of items [1] to [3], performing alloying treatment, and then performing cooling at average cooling rate of 5 to 100° C./sec.

Advantageous Effects of Invention

According to the present invention, a high-strength galvanized steel sheet and a high-strength galvannealed steel sheet having good surface appearance, a high tensile strength (TS) of 780 MPa or more and preferably 980 MPa or more, and high uniformity in material properties in the longitudinal directions of coils are produced. In the case where the high-strength galvanized steel sheet and the high-strength galvannealed steel sheet according to the present invention are used for skeletal members of automobile bodies, they contribute greatly to improvement in collision safety and a reduction in weight. Furthermore, their material properties are only slightly dependent on an annealing temperature. This results in high uniformity in material properties in coils. Furthermore, workability in press forming should be improved.

DESCRIPTION OF EMBODIMENTS

The present invention will be described in detail below.

Reasons for the limitation of contents of components of the present invention will be described below. Note that the term "%" regarding the components indicates % by mass.

C: 0.05% or more and less than 0.12%

C is an element effective in strengthening a steel sheet and contributes to the strengthening owing to the formation of martensite. C is combined with carbide-forming elements, such as Nb and Ti, to form fine alloy compounds or alloy carbonitrides, thereby contributing to strengthening. To provide these effects, the C content needs to be 0.05% or more. A C content of 0.12% or more results in significant degradation in spot weldability. Furthermore, a martensite phase tends to increase the hardness of a steel sheet to significantly reduce workability. Thus, the C content is 0.05% or more and less than 0.12% and preferably 0.05% or more and less than 0.10%. To stably ensure a tensile strength (TS) of 980 MPa or more, the C content is more preferably 0.08% or more.

Si: 0.01% or more and less than 0.35%

Si is an element that contributes to strengthening mainly by solid-solution hardening. A relatively small reduction in ductility is observed with respect to an increase in strength. In addition to the strengthening, Si also contributes to improvement in a balance between strength and ductility. To provide the effect, the Si content needs to be 0.01% or more. A Si content of 0.35% or more is liable to lead to the formation of a Si-based oxide on a surface of a steel sheet and thus can cause an uncoated portion. Thus, the Si content is 0.01% or more and less than 0.35% and preferably 0.01% or more and 0.25% or less.

Mn: 2.2% or more and 3.5% or less

Mn is an element that contributes to strengthening by solid-solution hardening and the formation of martensite. To provide the effect, the Mn content needs to be 2.2% or more. A Mn content more than 3.5% leads to an increase in the cost of raw materials and leads to, for example, the segregation of Mn, thereby forming a microstructure partially having portions with different transformation temperatures. As a result, a nonuniform microstructure including a ferrite phase and a martensite phase present in the form of bands is liable to be formed, thus possibly reducing workability. Such a Mn content can lead to an increase in the concentration of Mn in the form of an oxide on a surface of a steel sheet to cause an uncoated portion. Furthermore, such a Mn content can reduce the toughness of a spot weld zone to degrade weld characteristics. Thus, the Mn content is 2.2% or more and 3.5% or less. To stably ensure a tensile strength (TS) of 980 MPa or more, the Mn content is preferably 2.5% or more.

P: 0.001% or more and 0.050% or less.

P is an element effective in increasing the strength of a steel sheet by solid-solution hardening. However, at a P content less than 0.001%, the effect is not provided. Furthermore, dephosphorization cost can be increased in a steel-making process. Thus, the P content is 0.001% or more. A P content more than 0.050% results in significant degradation in weldability. Therefore, the P content is 0.001% or more and 0.050% or less and preferably 0.001% or more and 0.030% or less.

S: 0.010% or less

S is a harmful element which causes hotshort embrittlement and which is present in the form of a sulfide inclusion in steel to reduce the workability of a steel sheet. Thus, the S content is preferably minimized. In the present invention, the upper limit of the S content is 0.010% and preferably 0.008% or less. The lower limit is not specified. However, achieving a very low S content results in an increase in steel-making cost. Thus, the S content is preferably 0.0001% or more.

Sol. Al: 0.005% or more and 0.100% or less

Al is an element contained as a deoxidizer. Al has an ability for solid-solution hardening and thus acts effectively for strengthening. However, when the Al content is less than 0.005% in terms of sol. Al, the effect is not provided. An Al content more than 0.100% in terms of sol. Al results in an increase in the cost of raw materials and causes the surface defects of a steel sheet to be induced. Thus, the Al content in terms of sol. Al is 0.005% or more and 0.100% or less.

N: 0.0001% or more and 0.0060% or less

A N content more than 0.0060% results in the formation of an excess of a nitride in steel, thereby possibly reducing ductility and toughness and degrading the surface properties of a steel sheet. Thus, the N content is 0.0060% or less and preferably 0.0050% or less. From the viewpoint of improving ductility owing to higher cleanliness of ferrite, the N content is preferably minimized. However, the steel-making cost is increased. Thus, the lower limit is 0.0001%. Therefore, the N content is 0.0001% or more and 0.0060% or less and preferably 0.0050% or less.

Nb: 0.010% or more and 0.080% or less

Nb is combined with C or N to form a carbide or a carbonitride and thus contributes to strengthening. The precipitation hardening of ferrite produces the effect of reducing a difference in hardness between a martensite phase and a ferrite phase, thereby contributing to improvement in stretch-flangeability. Nb also has the effect of miniaturizing the microstructure of a hot-rolled steel sheet, so that ferrite and martensite after cold rolling and annealing are uniformly miniaturized. The uniform miniaturization of the microstructure of the steel sheet contributes to improvement in stretch-flangeability and a reduction in variations in material properties. To provide the effects, the Nb content is 0.010% or more, preferably 0.030% or more, and more preferably 0.040% or more. An excessive Nb content more than 0.080% results in an increase in load during hot rolling and results in an increase in deformation resistance during cold rolling, causing difficulty in stably producing an actual steel sheet. Furthermore, such an excessive Nb content results in a reduction in the ductility of ferrite to significantly reduce workability. Thus, the Nb content is 0.010% or more and 0.080% or less, preferably 0.030% or more and 0.080% or less, and, 0.040% or more and 0.080% or less.

Ti: 0.010% or more and 0.080% or less

As with Nb, Ti is combined with C or N to form a carbide or a carbonitride and thus contributes to strengthening. The strengthening of ferrite by precipitation hardening produces the effect of reducing a difference in hardness between a martensite phase and a ferrite phase, thereby contributing to improvement in stretch-flangeability. As with Nb, Ti also has the effect of miniaturizing the microstructure of a hot-rolled steel sheet, so that ferrite and martensite after cold rolling and annealing are uniformly miniaturized. The uniform miniaturization of the microstructure of the steel sheet contributes to improvement in stretch-flangeability and a reduction in variations in material properties. To provide the effects, the Ti content is 0.010% or more and preferably 0.030% or more. A Ti content more than 0.080% results in the saturation of the effects and results in the precipitation of an excess of Ti, thereby reducing the ductility of ferrite. Thus, the Ti content is 0.010% or more and 0.080% or less and preferably 0.030% or more and 0.080% or less.

The balance other than the foregoing components is composed of Fe and incidental impurities.

In the present invention, one or more elements selected from Mo, V, Cr, and B may be contained in addition to the foregoing elements essentially added.

One or more selected from 0.05% or more and 1.00% or less of Mo, 0.02% or more and 0.50% or less of V, 0.05% or more and 1.0% or less of Cr, and 0.0001% or more and 0.0030% or less of B Mo and Cr are elements which improve hardenability and which form martensite to contribute to strengthening. Mo and Cr may be contained, as needed. To provide the effects, each of the elements is preferably contained in an amount of 0.05% or more. In the case where the Mo content is more than 1.00% and where the Cr content is more than 1.0%, the foregoing effects are saturated, and the cost of raw materials are increased. Thus, the Mo content is preferably 1.00% or less, and the Cr content is preferably 1.0% or less.

As with Nb and Ti, V forms a fine carbonitride to contribute to an increase in strength and thus may be contained, as needed. To provide the effect, the V content is preferably 0.02% or more. A V content more than 0.50% results in the saturation of the effect and leads to an increase in the cost of raw materials. Thus, the V content is preferably 0.50% or less.

B improves hardenability, inhibits the formation of ferrite during annealing and cooling, and forms martensite to contribute to strengthening. To provide the effects, the B content needs to be 0.0001% or more. A B content more than 0.0030% results in the saturation of the effects. Thus, the B content is preferably 0.0001% or more and 0.0030% or less.

In the present invention, the following elements may be appropriately contained as long as the effects of the present invention are not impaired.

Cu is a harmful element that causes cracking during hot rolling and is responsible for a surface flaw. In the present invention, however, Cu has only a small adverse effect on the properties of a steel sheet. Thus, a Cu content of 0.30% or less is acceptable. Accordingly, recycled raw materials, such as scrap, may be used.

As with Cu, Ni has only a small effect on the properties of a steel sheet. Ni has the effect of inhibiting the occurrence of a surface flaw due to the addition of Cu. The effect is provided when the Ni content is ½ or more of the Cu content. However, an excess Ni content promotes the occurrence of another surface defect attributed to the nonuniform formation of scale. Thus, when Ni is contained, the upper limit of the Ni content is 0.30%.

Ca has the effect of controlling the form of sulfide, such as MnS, to improve ductility. However, even at a high Ca content, the effect tends to be saturated. Thus, when Ca is contained, the Ca content is 0.0001% or more and 0.0050% or less.

REMs have the effect of controlling the form of a sulfide inclusion to contribute to improve workability. Sn and Sb have the effect of granulating crystals on a surface of a steel sheet. Each of them may be contained in an amount of 0.0001% to 0.1000%.

Zr, Mg, and so forth form precipitates. Thus, the contents of them are preferably minimized. There is no need for active addition. If they are added, they are contained in an amount less than 0.020% and preferably less than 0.002%.

A microstructure after primary annealing and secondary (final) annealing will be described below.

To reduce variations in material properties of a high-strength steel sheet according to the present invention at the time of the secondary (final) annealing, the total area proportion of martensite, bainite, pearlite, and retained austenite in the microstructure of the steel sheet after the primary annealing is preferably 20% or more and 60% or less. To stably obtain a tensile strength (TS) of 780 MPa or more, the microstructure of the steel sheet after secondary (final) annealing needs to contain martensite in an area proportion of 20% or more and 60% or less and ferrite in an area proportion of 40% or more and 80% or less.

Total area proportion of martensite, bainite, pearlite, and retained austenite in microstructure of steel sheet after primary annealing: 20% or more and 60% or less In the present invention, the total area proportion of martensite, bainite, pearlite, and retained austenite in the microstructure of the steel sheet after the primary annealing is preferably controlled in order to produce a high-strength steel sheet with only small variations in material properties. Specifically, martensite, bainite, pearlite, and retained austenite present after the primary annealing are microstructures in which austenite containing C, Mn, and so forth that have been concentrated during soaking at the time of the primary annealing is transformed or remains untransformed during cooling after the soaking, regions of the microstructures having high concentrations of C and Mn. The regions having high concentrations of C and Mn reduce the ferrite-austenite transformation temperature during the secondary annealing. Thus, the secondary annealing in a temperature range of 750° C. to 850° C. results in only small variations in the area proportion of martensite. In general, the total area proportion of martensite, bainite, pearlite, and retained austenite after the primary annealing correlates with the area proportion of martensite after the secondary (final) annealing. Thus, the total area proportion of martensite, bainite, pearlite, and retained austenite is preferably 20% or more in order to satisfy a tensile strength (TS) of 780 MPa or more after the secondary (final) annealing. When the total area proportion of martensite, bainite, pearlite, and retained austenite after the primary annealing is more than 60%, the area proportion of martensite after the secondary (final) annealing is more than 60%, thus possibly causing difficulty in ensuring workability. Therefore, the total area proportion of martensite, bainite, pearlite, and retained austenite after the primary annealing is preferably 60% or less and more preferably 50% or less. In a steel sheet after the primary annealing, the balance other than martensite, bainite, pearlite, or retained austenite is a microstructure mainly composed of a ferrite phase.

Area proportion of martensite after secondary (final) annealing: 20% or more and 60% or less Martensite is a hard phase needed to ensure the strength of a steel sheet of the present invention. However, an area proportion of martensite less than 20% results in a reduction in the strength of the steel sheet, thereby causing difficulty in ensuring a tensile strength (TS) of 780 MPa or more. Thus, the area proportion of martensite is 20% or more. To stably ensure a tensile strength (TS) of 980 MPa or more, the area proportion of martensite is preferably 35% or more. An area proportion of martensite more than 60% can result in an excess of the hard phase to cause difficulty in ensuring workability. Thus, the area proportion of martensite is 60% or less and preferably 50% or less.

Average grain size of martensite phase after secondary (final) annealing: 5 μm or less When the average grain size of a martensite phase is more than 5 μm, a void is liable to be formed at an interface between soft ferrite and hard martensite, thereby possibly reducing stretch-flangeability and local ductility. When the average grain size of a martensite phase after the secondary (final) annealing is 5 μm or less, the formation of a void is inhibited at the interface between ferrite and martensite, thereby inhibiting a reduction in stretch-flangeability. Thus, in the present invention, the average grain size of martensite after the secondary (final) annealing is preferably 5 μm or less and more preferably 2 μm or less.

Area proportion of ferrite phase after secondary (final) annealing: 40% or more and 80% or less The ferrite phase is an important factor in ensuring ductility. When the area proportion of the ferrite phase is less than 40%, it is difficult to ensure ductility, thereby possibly reducing workability. Thus, the area proportion of the ferrite phase is 40% or more and preferably 50% or more in order to ensure ductility. When the area proportion of the ferrite phase is more than 80%, it is difficult to ensure a tensile strength (TS) of 780 MPa or more. Thus, the area proportion of the ferrite phase is 80% or less. To stably ensure a tensile strength (TS) of 980 MPa or more, the area proportion of the ferrite phase is preferably 65% or less.

Average grain size of ferrite after secondary (final) annealing: 10 μm or less

Ferrite with a small average grain size contributes to the miniaturization of martensite formed from ferrite grain boundaries by reverse transformation, thereby contributing to stretch-flangeability. Thus, ferrite preferably has an average grain size of 10 μm or less.

In a steel sheet (steel sheet after the secondary (final) annealing) produced according to the present invention, balance microstructures other than ferrite or martensite contain pearlite, bainite, retained austenite, carbide, and so forth. They may be acceptable as long as the total area proportion thereof is 5% or less.

The area proportion may be determined by polishing an L section (vertical section parallel to a rolling direction) of a steel sheet, etching the section with nital, observing the section with a scanning electron microscope (SEM) at a magnification of ×2000 in the five fields of view, and capturing an microstructural image, and analyzing the microstructural image by image analysis. In the microstructural image, ferrite appears as a darkish region. Pearlite appears as a region containing a lamellar carbide. Bainite appears as a region containing a carbide with a dot pattern. Martensite and retained austenite (retained γ) appear as white grains. The average grain size of each of ferrite and martensite is measured by an intercept method according to JIS G0522.

The high-strength steel sheet according to the present invention has the following properties.

(1) TS≥780 MPa, preferably TS≥980 MPa: In recent years, there have been strong demands for a reduction in the weight of automobile bodies and ensuring the safety of passengers in case of vehicle crashes. To meet these demands, it is necessary to increase the strength of steel sheets used for automobile bodies. To provide the effects, in the present invention, the tensile strength (TS) is limited to 780 MPa or more and preferably 980 MPa or more.

(2) Variations in tensile strength (TS) in longitudinal direction of coil (ΔTS)≤50 MPa: Variations in tensile strength (TS) in the longitudinal direction of a coil are evaluated as follows: JIS No. 5 test pieces for a tensile test (JIS Z 2201) in which a tensile direction (C direction) is a direction perpendicular to the rolling direction are sampled from nine points located at central positions in the width direction and positions away from both sides in the width direction by ¼ of the width in a leading end portion (T portion: a position 10 m from the leading end of the coil), a middle portion (M portion), and a trailing end portion (B portion: a position 10 m from the trailing end of the coil) of the resulting coil in the longitudinal direction. A tensile test according to JIS Z 2241 is performed to evaluate a difference between the maximum value and the minimum value of the tensile strength (TS), i.e., ΔTS. In the present invention, ΔTS is 50 MPa or less in order to produce a steel sheet having good uniformity in material properties in the longitudinal direction of a coil. Methods for producing a high-strength galvanized steel sheet and a high-strength galvannealed steel sheet will be described below.

The high-strength galvanized steel sheet and the high-strength galvannealed steel sheet according to the present invention are produced by forming a molten steel having a component composition adjusted to the foregoing ranges into a slab and subjecting the slab to hot rolling, cold rolling, primary annealing, pickling, and secondary (final) annealing.

<Production of Slab>

The steel slab used in the production methods according to the present invention is preferably produced by a continuous casting process in order to prevent the formation of macrosegregation of the components and may also be produced by an ingot-making process or a thin slab casting process. A conventional process including cooling the steel slab to room temperature and reheating the steel slab may also be employed. Furthermore, an energy-saving process may also be employed to the steel slab without any problem. Examples thereof include hot direct rolling in which a hot steel slab is transferred into a furnace without cooling and is hot-rolled; hot direct rolling and direct rolling in which a steel slab is slightly heated and immediately hot-rolled; and hot charging in which a hot steel slab is transferred into a furnace while maintained at a high temperature to partially omit reheating.

Slab heating temperature: 1150° C. or higher and 1300° C. or lower

Precipitates present in a step of heating a steel slab will be present as coarse precipitates in a steel sheet to be ultimately produced and do not contribute to strength. It is thus necessary to redissolve Ti- and Nb-based precipitates precipitated during casting. Defects, such as voids and segregation, on a surface of the slab are scaled off to reduce cracks and irregularities on a surface of a steel sheet, thereby forming a smooth surface of the steel sheet. To this end, heating to 1150° C. or higher is effective. Thus, a slab heating temperature is preferably 1150° C. or higher. A slab heating temperature higher than 1300° C. results in the formation of coarse grains of austenite to coarsen the ultimate microstructure, thereby possibly reducing stretch-flangeability. Thus, the slab heating temperature is preferably 1150° C. or higher and 1300° C. or lower.

<Hot Rolling>

The steel slab produced as above is subjected to hot rolling including rough rolling and finish rolling. The steel slab is formed into a sheet bar by rough rolling. Conditions of the rough rolling are not necessarily particularly specified. The rough rolling may be performed in the usual manner. To prevent trouble with hot rolling due to a reduction in surface temperature, the use of a sheet-bar heater configured to heat a sheet bar is an effective method.

Finish rolling temperature: 850° C. to 950° C.

A finish rolling temperature lower than 850° C. results in a nonuniform microstructure, thereby significantly reducing workability (ductility and stretch-flangeability). A finish rolling temperature higher than 950° C. results in a significant increase in the amount of oxide (scale) formed to roughen the interface between base iron and the oxide. The surface quality after pickling and cold rolling tends to degrade. Furthermore, the grain size can be excessively increased to roughen a press surface during processing. Thus, the finish rolling temperature is preferably 850° C. to 950° C.

The hot-rolled sheet that has been subjected to the foregoing hot rolling is preferably processed as described below from the viewpoint of improving stretch-flangeability and reducing variations in material properties by further miniaturization of the microstructure. After the completion of the finish rolling, cooling is started within 3 seconds. The cooling is performed at an average cooling rate of 5 to 200° C./sec. in a temperature range of the finish rolling temperature to (the finish rolling temperature—100° C.) Coiling is performed at 450° C. to 650° C.

Average cooling rate at finish rolling temperature to (finish rolling temperature—100° C.): 5 to 200° C./sec. or less In the case where the time from the completion of the finish rolling to the start of the cooling is more than 3 seconds, the average cooling rate is less than 5° C./sec. in the temperature range of the finish rolling temperature to (the finish rolling temperature—100° C.), or the cooling stop temperature after the finish rolling is higher than (the finish rolling temperature—100° C.), coarse ferrite is precipitated. The microstructure of the hot-rolled sheet is easily coarsened. In addition, a band-like microstructure in which ferrite and pearlite are formed in the form of lamellae is easily formed. The band-like microstructure is in a state in which the concentration of each component is nonuniform in the steel sheet. Thus, the band-like microstructure is easily formed into a nonuniform microstructure after cold rolling and annealing, thereby causing difficulty in uniformly miniaturizing the microstructure. This can result in a reduction in workability, such as stretch-flangeability, and an increase in variations in material properties. Even if the average cooling rate is more than 200° C./sec. in the temperature range of the finish rolling temperature to (the finish rolling temperature—100° C.), the effect is saturated. Thus, the average cooling rate is preferably 5 to 200° C./sec. or less in the temperature range of the finish rolling temperature to (the finish rolling temperature—100° C.)

Coiling temperature: 450° C. or higher and 650° C. or lower

The coiling temperature significantly affects the precipitation of NbC. A coiling temperature lower than 450° C. results in insufficient precipitation of NbC, thereby easily causing nonuniform precipitation of NbC in the coil. Different microstructures due to recrystallization behavior during heating for annealing after the cold rolling can increase variations in material properties. A coiling temperature higher than 650° C. results in the precipitation of coarse NbC. This causes insufficient precipitation hardening of ferrite with NbC. Thus, the effect of reducing a difference in hardness between a martensite phase and a ferrite phase can fail to provide the improvement effect on stretch-flangeability. Therefore, the coiling temperature is preferably 450° C. or higher and 650° C. or lower and more preferably 500° C. or higher and 600° C. or lower.

<Cold Rolling>

Subsequently, pickling is performed, as needed. Then the cold rolling is performed to form a cold-rolled sheet. The pickling is not essential and may be performed, as needed. When the pickling is performed, the pickling may be performed under normal conditions.

Rolling reduction during cold rolling: 40% or more and 70% or less

A rolling reduction less than 40% during the cold rolling can result in nonuniform recrystallization during heating in annealing to fail to form a uniform fine annealed microstructure. In addition, usual possible variations of the microstructure of a hot-rolled sheet in a coil can remain as they are even after cold rolling and annealing to increase variations in material properties. To promote recrystallization during heating in annealing to form more uniform fine microstructure, the rolling reduction during the cold rolling is preferably 40% or more. A rolling reduction of more than 70% results in a high load on rollers, thereby possibly causing trouble with rolling. Thus, the upper limit of the rolling reduction is preferably about 70%.

<Primary Annealing>

Average heating rate in temperature range of 600° C. to 750° C.: 0.1° C./sec. or more and less than 3° C./s3c.

In the present invention, TiC and NbC are precipitated in the stage of a hot-rolled steel sheet. Thus, the recrystallization temperature of a cold-rolled steel sheet produced in a cold rolling step is relatively high, so that a worked structure is liable to be left after annealing. In this case, variations in material properties are increased after pickling and secondary (final) annealing. This can cause difficulty in stably performing press forming in a continuous press line for automobiles to significantly reduce workability. Thus, when the cold-rolled steel sheet is heated to an annealing temperature, the heating needs to be performed at a low average heating rate less than 3° C./sec. in a temperature range of 600° C. to 750° C. in order to promote recrystallization to ensure uniformity in material properties. At a heating temperature lower than 600° C., recrystallization does not occur. Thus, even though the heating rate is appropriately controlled, a desired recrystallized microstructure is not formed, in some cases. A heating temperature higher than 750° C. results in the progress of ferrite-austenite transformation. Thus, the microstructure after the secondary (final) annealing can be nonuniform by competition between the recrystallization and the ferrite-austenite transformation, thereby possibly increasing the variations in material properties. When the average heating rate is less than 0.1° C./sec. in a temperature range of 600° C. to 750° C., the grain size can be increased to reduce stretch-flangeability after the secondary (final) annealing. Thus, average heating rate is 0.1° C./sec. or more.

Annealing temperature of 750° C. to 850° C. maintained for 10 to 500 seconds

At an annealing temperature lower than 750° C., recrystallization can fail to be completed during the primary annealing. A remaining worked microstructure in steel can cause difficulty in producing a high-strength steel sheet having only small variations in material properties after the secondary annealing. An annealing temperature higher than 850° C. results in the formation of coarse ferrite and austenite during the annealing, thereby coarsening the microstructure after cooling. Thus, the microstructure after the secondary annealing is also coarsened, possibly failing to provide the improvement effect on stretch-flangeability. Furthermore, a reduction in productivity and an increase in energy cost are disadvantageously caused. Therefore, the annealing temperature is 750° C. or higher and 850° C. or lower.

The holding time in the annealing is 10 seconds or more in order to promote recrystallization, ferrite-austenite transformation, and the concentration of an element, such as C, in austenite. A holding time more than 500 seconds can result in coarsening of crystal grains, thereby possibly leading to degradation of the characteristics of the steel sheet, for example, a reduction in strength, degradation in surface properties, and a reduction in stretch-flangeability. Thus, the holding time in the annealing is 10 seconds or more and 500 seconds or less, and preferably 20 seconds or more and 200 seconds or less.

Average cooling rate between annealing temperature of 750° C. to 850° C. and cooling stop temperature of 600° C. or lower: 1 to 15° C./sec.

When the average cooling rate between the annealing temperature and a cooling stop temperature of 600° C. or lower is more than 15° C./sec, the formation of ferrite during cooling is inhibited. Thus, hard phases, such as martensite, bainite, pearlite, and retained γ, are excessively formed after the primary annealing. In this case, the volume proportion of martensite after the secondary (final) annealing exceeds the range of the present invention to excessively increase the strength, thereby possibly degrading workability, such as ductility and stretch-flangeability. An average cooling rate less than 1° C./sec. results in an excessively large amount of ferrite formed during cooling, thereby failing to form a predetermined amount of martensite after the secondary (final) annealing. Thus, a predetermined tensile strength (TS) is not obtained, in some cases. A cooling stop temperature higher than 600° C. does not result in a predetermined amount of martensite after the secondary (final) annealing, thereby possibly failing to obtain a desired tensile strength (TS). Thus, the average cooling rate in the temperature range between an annealing temperature range of 750° C. to 850° C. and 600° C. or lower is 1 to 15° C./sec. and preferably 3 to 15° C./sec. The cooling is preferably performed by gas cooling and may also be performed by, for example, furnace cooling, mist cooling, roll cooling, water cooling, or a combination thereof.

<Pickling>

Pickling weight loss of steel sheet in terms of Fe: 0.05 to 5 g/m$^2$

Surface segregated compounds of oxidizable elements, such as Si and Mn, formed in the primary annealing significantly degrade wettability after the secondary annealing. To remove the surface segregated compounds of Si, Mn, and so forth to improve the wettability, the pickling is performed. The pickling is performed in such a manner that the pickling weight loss of the steel sheet in terms of Fe is 0.05 to 5 g/m$^2$, thereby completely removing the surface segregated compounds. For example, pickling treatment with about 1% to 10% by weight of an acid (hydrochloric acid, sulfuric acid, nitric acid, or the like) at 40° C. to 90° C. for 1 to 20 seconds completely removes the surface segregated compounds. A pickling-solution concentration less than 1% by weight results in a pickling weight loss less than 0.05 g/m$^2$ in terms of Fe. In this case, the surface segregated compounds are not sufficiently removed by the pickling. A pickling-solution concentration more than 10% by weight results in a pickling weight loss more than 5 g/m². In this case, a surface of the steel sheet can be roughened by excessive pickling. An acid temperature lower than 40° C. results in a pickling weight loss less than 0.05 g/m² in terms of Fe. In this case, the surface segregated compounds are not sufficiently removed by the pickling. An acid temperature higher than 90° C. results in a pickling weight loss more than 5 g/m². In this case, a surface of the steel sheet can be roughened by excessive pickling. At a pickling time less than 1 second, the surface segregated compounds are not sufficiently removed by the pickling. At a pickling time more than 20 seconds, a surface of the steel sheet can be roughened by excessive pickling. Thus, pickling conditions preferably include an acid temperature of 40° C. to 90° C., an acid concentration of 1% to 10% by weight, and a pickling time of 1 to 20 seconds. An acid temperature of 50° C. to 70° C. and a pickling time of 5 to 10 seconds are more preferred.

In the present invention, a difference in total weight before and after the pickling is divided by the total surface area of the steel sheet to determine the pickling weight loss in terms of Fe.

<Secondary (Final) Annealing>

Annealing temperature at 750° C. to 850° C. maintained for 10 to 500 seconds

An annealing temperature lower than 750° C. does not result in a predetermined amount of martensite after annealing and cooling, thereby possibly failing to obtain the desired strength. An annealing temperature higher than 850° C. results in coarsening of ferrite and austenite during the annealing to coarsen the microstructure after the cooling, thereby possibly reducing the strength and failing to provide the improvement effect on stretch-flangeability. Furthermore, although Si and Mn have been removed in the pickling step, they are reconcentrated on a surface to form surface segregated compounds that degrade wettability, in some cases. Furthermore, a reduction in productivity and an increase in energy cost are disadvantageously caused. Thus, the annealing temperature is 750° C. or higher and 850° C. or lower.

The holding time in the annealing is 10 seconds or more in order to promote ferrite-austenite transformation and the concentration of an element, such as C, in austenite. A holding time more than 500 seconds results in an increase in grain size, thereby possibly leading to degradation of the characteristics of the steel sheet, for example, reductions in strength and stretch-flangeability. Furthermore, Si and Mn are reconcentrated on a surface to degrade wettability, in some cases. Thus, the holding time in the annealing is 10 to 500 seconds.

Cooling from annealing temperature of 750° C. to 850° C. at an average cooling rate (primary cooling rate) of 1 to 15° C./sec.

The steel sheet is soaked at the annealing temperature and then cooled to the temperature of a galvanizing bath typically maintained at 420° C. to 500° C. at an average cooling rate (primary cooling rate) of 1 to 15° C./sec. An average cooling rate more than 15° C./sec. results in the inhibition of the formation of ferrite during cooling. Thus, hard phases, such as martensite and bainite, are excessively formed to excessively increase the strength, thereby degrading workability, such as ductility and stretch-flangeability. An average cooling rate less than 1° C./sec. results in an excessively large amount of ferrite formed during the cooling, thereby possibly failing to obtain a desired tensile strength (TS). Thus, the average cooling rate from the annealing temperature to the galvanizing bath is 1 to 15° C./sec. The cooling is preferably performed by gas cooling and may also be performed by, for example, furnace cooling, mist cooling, roll cooling, water cooling, or a combination thereof.

<Galvanizing Treatment or Alloying Treatment>

The steel sheet is cooled at the primary cooling rate and then immersed in a galvanizing bath for galvanizing treatment. The galvanizing treatment may be performed in the usual manner. After the immersion of the steel sheet in the galvanizing bath for the galvanizing treatment, the steel sheet may be subjected to alloying treatment for a coated layer. In this case, the alloying treatment for the coated layer may be performed by, for example, after the galvanizing treatment, heating the coated layer to a temperature range of 500° C. to 650° C. and maintaining the coated layer at the temperature for several to several tens of seconds. Regarding galvanizing treatment conditions, the coating weight is 20 to 70 g/m² per side. In the case of alloying, the coated layer preferably has an Fe content of 6% to 15%.

Average cooling rate (secondary cooling rate) of 5 to 100° C./sec. after galvanizing treatment or alloying treatment When slow cooling with an average cooling rate (secondary cooling rate) less than 5° C./sec. is performed after the galvanizing treatment or the alloying treatment, pearlite or bainite is formed at about 400° C. to about 500° C., and a predetermined amount of martensite is not formed, thereby possibly failing to obtain the desired strength. An average cooling rate more than 100° C./sec. can result in excessively hard martensite to reduce ductility and stretch-flangeability. Thus, the average cooling rate (secondary cooling rate) after the galvanizing treatment or the alloying treatment is 5 to 100° C./sec. The cooling is preferably performed to a temperature of 150° C. or lower. In this case, the average cooling rate is defined as an average cooling rate from the galvanizing treatment or the alloying treatment to a cooling stop temperature of 150° C. or lower.

In the present invention, the ultimately produced high-strength galvanized steel sheet and high-strength galvannealed steel sheet after the annealing may be subjected to temper rolling or a leveling process in order to perform shape correction and adjust surface roughness. However, when the temper rolling is excessively performed, strain is excessively introduced to form a rolled microstructure including elongated crystal grains, thereby reducing ductility. Thus, when the temper rolling is performed, the elongation percentage is preferably about 0.1% to about 1.5%.

EXAMPLE 1

Examples of the present invention will be described below.

Molten steels having compositions listed in Table 1 were produced in a steel making converter and formed into slabs. Each of the slabs was subjected to hot rolling, cold rolling, primary annealing, pickling, and secondary annealing under conditions listed in Table 2 to produce a 1.2-mm-thick high-strength galvannealed steel sheet (product sheet). The galvanizing treatment was adjusted in such a manner that the coating weight was 50 g/m² per side (coating on both sides). The Fe content of the coated layer was adjusted to 9% to 12%.

TABLE 1

| Steel No. | Component composition (% by mass) | | | | | | | | | | | | | Remarks |
|---|---|---|---|---|---|---|---|---|---|---|---|---|---|---|
| | C | Si | Mn | P | S | sol.Al | N | Nb | Ti | Mo | V | Cr | B | |
| A | 0.04 | 0.02 | 2.1 | 0.011 | 0.005 | 0.038 | 0.0021 | 0.041 | 0.033 | | | | | Comparative steel |
| B | 0.07 | 0.12 | 2.3 | 0.008 | 0.003 | 0.031 | 0.0033 | 0.023 | 0.020 | | 0.05 | 0.08 | 0.0005 | Inventive steel |
| C | 0.07 | 0.09 | 2.4 | 0.015 | 0.008 | 0.037 | 0.0039 | 0.063 | 0.036 | | | | | Inventive steel |
| D | 0.08 | 0.16 | 2.5 | 0.013 | 0.003 | 0.038 | 0.0033 | 0.052 | 0.055 | 0.15 | | 0.15 | | Inventive steel |
| E | 0.09 | 0.13 | 2.6 | 0.007 | 0.001 | 0.037 | 0.0035 | 0.042 | 0.020 | 0.08 | | 0.51 | 0.0010 | Inventive steel |
| F | 0.08 | 0.12 | 2.5 | 0.008 | 0.003 | 0.034 | 0.0034 | 0.041 | 0.022 | 0.11 | | 0.58 | 0.0008 | Inventive steel |
| G | 0.08 | 0.19 | 3.1 | 0.019 | 0.002 | 0.049 | 0.0039 | 0.048 | 0.015 | | | | | Inventive steel |
| H | 0.10 | 0.15 | 3.3 | 0.042 | 0.005 | 0.039 | 0.0031 | 0.038 | 0.028 | | | | | Inventive steel |
| I | 0.10 | 0.26 | 3.1 | 0.018 | 0.007 | 0.038 | 0.0032 | 0.023 | 0.075 | | | | | Inventive steel |
| J | 0.09 | 0.13 | 3.0 | 0.017 | 0.009 | 0.041 | 0.0025 | 0.004 | 0.006 | | | | | Comparative steel |
| K | 0.11 | 0.31 | 2.9 | 0.065 | 0.013 | 0.042 | 0.0042 | 0.095 | 0.088 | | | | | Comparative steel |
| L | 0.13 | 0.52 | 3.8 | 0.021 | 0.008 | 0.041 | 0.0035 | 0.025 | 0.075 | | | | | Comparative steel |

TABLE 2

| Steel sheet No. | Steel No. | Hot rolling step | | | | Cold rolling step Rolling reduction (%) | Primary annealing step | | | | Total area proportion of hard phase (%)*3 |
|---|---|---|---|---|---|---|---|---|---|---|---|
| | | Slab heating temperature (° C.) | Finish temperature (° C.) | Average cooling rate (° C./sec)*1 | Coiling temperature (° C.) | | Average heating rate from 650° C. to 750° C. (° C./sec) | Annealing temperature (° C.) | Holding time at annealing temperature (second) | Average cooling rate (° C./sec)*2 | |
| 1 | A | 1220 | 890 | 50 | 550 | 50 | 1 | 820 | 100 | 5 | 13 |
| 2 | B | 1220 | 890 | 50 | 550 | 50 | 1 | 820 | 100 | 5 | 29 |
| 3 | C | 1220 | 890 | 50 | 550 | 50 | 1 | 820 | 100 | 5 | 36 |
| 4 | D | 1220 | 890 | 50 | 550 | 50 | 1 | 820 | 100 | 5 | 39 |
| 5 | E | 1220 | 890 | 50 | 550 | 50 | 1 | 820 | 100 | 5 | 42 |
| 6 | F | 1220 | 890 | 50 | 550 | 50 | 1 | 820 | 100 | 5 | 41 |
| 7 | G | 1220 | 890 | 50 | 550 | 50 | 1 | 820 | 100 | 5 | 44 |
| 8 | H | 1220 | 890 | 50 | 550 | 50 | 1 | 820 | 100 | 5 | 47 |
| 9 | I | 1220 | 890 | 50 | 550 | 50 | 1 | 820 | 100 | 5 | 51 |
| 10 | J | 1220 | 890 | 50 | 550 | 50 | 1 | 820 | 100 | 5 | 48 |
| 11 | K | 1220 | 890 | 50 | 550 | 50 | 1 | 820 | 100 | 5 | 56 |
| 12 | L | 1220 | 890 | 50 | 550 | 50 | 1 | 820 | 100 | 5 | 65 |

| Steel sheet No. | Pickling step*4 Pickling weight loss (g/m²) | Secondary annealing step | | | | | Temper rolling step Elongation percentage (%) |
|---|---|---|---|---|---|---|---|
| | | Annealing temperature (° C.) | Holding time at annealing temperature (second) | Primary cooling rate (° C./sec)*5 | Alloying condition | Secondary cooling rate (° C./sec)*6 | |
| 1 | 0.5 | 800 | 100 | 3 | 520° C. × 20 sec. | 15 | 0.3 |
| 2 | 0.5 | 800 | 100 | 3 | 520° C. × 20 sec. | 15 | 0.3 |
| 3 | 0.5 | 800 | 100 | 3 | 520° C. × 20 sec. | 15 | 0.3 |
| 4 | 0.5 | 800 | 100 | 3 | 520° C. × 20 sec. | 15 | 0.3 |
| 5 | 0.5 | 800 | 100 | 3 | 520° C. × 20 sec. | 15 | 0.3 |
| 6 | 0.5 | 800 | 100 | 3 | 520° C. × 20 sec. | 15 | 0.3 |
| 7 | 0.5 | 800 | 100 | 3 | 520° C. × 20 sec. | 15 | 0.3 |
| 8 | 0.5 | 800 | 100 | 3 | 520° C. × 20 sec. | 15 | 0.3 |
| 9 | 0.5 | 800 | 100 | 3 | 520° C. × 20 sec. | 15 | 0.3 |
| 10 | 0.5 | 800 | 100 | 3 | 520° C. × 20 sec. | 15 | 0.3 |
| 11 | 0.5 | 800 | 100 | 3 | 520° C. × 20 sec. | 15 | 0.3 |
| 12 | 0.5 | 800 | 100 | 3 | 520° C. × 20 sec. | 15 | 0.3 |

*1: Ave age cooling rate from the finish temperature to (the finish temperature −100° C.).
*2: Average cooling rate from the annealing temperature to a temperature of 600° C. or lower.
*3: Total area proportion of martensite, bainite, pearlite, and retained γ
*4: Pickling with 5% hydrochloric acid at 60° C. for 10 seconds.
*5: Average cooling rate from the annealing temperature to the galvanizing bath temperature.
*6: Average cooling rate to a temperature of 150° C. or lower after the galvanizing treatment or alloying treatment for the coated layer.

Samples were taken from the resulting galvannealed steel sheets. Each of the samples was subjected to microstructural observation and a tensile test in which a tensile direction (C direction) is a direction perpendicular to a rolling direction by the following methods, thereby identifying the microstructure of the steel sheet and measuring the area proportions of a ferrite phase and a martensite phase, the average grain sizes of ferrite and martensite, the yield point (YP), the tensile strength (TS), the total elongation (El), and the hole expansion ratio (λ). The appearance after coating and the appearance after alloying were visually observed to evaluate surface properties. Furthermore, JIS No. 5 test pieces for a tensile test in which the tensile direction (C direction) is a direction perpendicular to the rolling direction were sampled from nine points located at central positions in the width direction and positions away from both sides in the width direction by ¼ of the width in a leading end portion (T portion: a position 10 m from the leading end of the coil), a middle portion (M portion), and a trailing end portion (B portion: a position 10 m from the trailing end of the coil) of the resulting coil in the longitudinal direction. The tensile test was performed to evaluate a difference between the maximum value and the minimum value of the tensile strength (TS), i.e., ΔTS. An evaluation method will be specifically described below.

(i) Microstructural Observation

A test specimen for microstructural observation was taken from each of the galvannealed steel sheets. An L section (a vertical section parallel to the rolling direction) was mechanically polished and etched with nital. The identification of the microstructure of the steel sheet and the measurement of the area proportions of ferrite and martensite were performed using a microstructural image (SEM image) captured with a scanning electron microscope (SEM) at a magnification of ×3000. On the microstructural image, the microstructure of the steel sheet was identified as follows: Ferrite appeared as a darkish region. Pearlite appeared as a region containing a lamellar carbide. Bainite appeared as a region containing a carbide with a dot pattern. Martensite and retained austenite (retained γ) appeared as white grains. The test specimen was subjected to tempering at 250° C. for 4 hours. A microstructural image was captured as described above. A region containing a lamellar carbide was regarded as pearlite before the heat treatment. A region containing a carbide with a dot pattern was regarded as bainite or martensite before the heat treatment. The area proportions were determined again. Fine white grains were regarded as retained γ. The area proportion of martensite was determined from the difference between the area proportion of the fine white grains and the area proportion of white grains before the tempering (martensite and retained γ). The area proportion of each phase was determined using image analysis software (Digital Image Pro Plus ver. 4.0, manufactured by Microsoft Corp.) after coloring each phase differently on a transparent sheet and performing binarization after image capturing. The average grain sizes of ferrite and martensite were measured using an intercept method according to JIS G0522.

The microstructure after the primary annealing was measured in the same manner as above to determine the total area proportion of martensite, bainite, pearlite, and retained γ.

(ii) Tensile Properties

JIS No. 5 test pieces for the tensile test (JIS Z 2201) in which the tensile direction (C direction) was a direction perpendicular to the rolling direction were sampled from the galvannealed steel sheets. Each of the test pieces was subjected to the tensile test according to JIS Z 2241 to measure YP, TS, and El. Regarding evaluation criteria of the tensile test, TS≥780 MPa (preferably TS≥980 MPa), and TS×El≥15000 MPa·%.

JIS No. 5 test pieces for a tensile test (JIS Z 2201) in which the tensile direction (C direction) is a direction perpendicular to the rolling direction were sampled from nine points located at central positions in the width direction and positions away from both sides in the width direction by ¼ of the width in a leading end portion (T portion: a position 10 m from the leading end of the coil), a middle portion (M portion), and a trailing end portion (B portion: a position 10 m from the trailing end of the coil) of the resulting coil in the longitudinal direction. The tensile test was performed according to JIS Z 2241 to evaluate a difference between the maximum value and the minimum value of the tensile strength (TS), i.e., ΔTS. In the present invention, in order to produce a steel sheet having good uniformity in material properties in the longitudinal direction of the coil, ΔTS≤50 MPa.

(iii) Stretch-Flangeability

The stretch-flangeability was evaluated by a hole-expanding test according to Japan Iron and Steel Federation Standard JFST 1001. A sample with a size of 100 mm×100 mm was taken from each of the galvannealed steel sheets. A punch hole was formed in the sample with a punch with a diameter of 10 mm. The hole-expanding test was performed using a conical punch having a cone angle of 60° with burrs extending outward until a crack passing through the thickness was formed. Here, the hole expansion ratio λ (%)={(d−$d_0$)/$d_0$}×100 was calculated where $d_0$ denotes the initial inside diameter (mm) of the hole, and d denotes the inside diameter (mm) of the hole at the time of the formation of the crack. Regarding evaluation criteria of the hole expansion ratio, TS×λ was 40,000 MPa·% and preferably 43,000 MPa·% or more.

(iv) Surface Properties

The appearance after coating was visually evaluated. When no uncoated portion was formed, the appearance was rated as ○. When an uncoated portion was formed, the appearance was rated as ×. In addition, the appearance after alloying was visually evaluated. When an unevenly alloyed potion was formed, the appearance was rated as ×. When a uniform appearance was provided without forming an unevenly alloyed potion, the appearance was rated as ○.

Table 3 lists the results.

Moreover, neither an uncoated portion nor an unevenly alloyed portion is formed. This indicates that the steel sheets have good surface properties.

In contrast, in steel sheet 1 of a comparative example, the C content and the Mn content are outside the ranges of the present invention. Thus, a desired amount of martensite is not obtained. Accordingly, TS≥780 MPa is not achieved. In steel sheet 10 of a comparative example, the Nb content and the Ti content are outside the ranges of the present invention. Thus, the precipitation hardening of ferrite is insufficient, so

TABLE 3

| | | Steel microstructure | | | | | | | | | | | | Surface properties | | |
|---|---|---|---|---|---|---|---|---|---|---|---|---|---|---|---|---|
| | | Ferrite | | Martensite | | Microstructure of balance* Area proportion (%) | Mechanical properties | | | | | | | Appearance after coating | Appearance after alloying | |
| Steel sheet No. | Steel No. | Area proportion (%) | Average grain size (μm) | Area proportion (%) | Average grain size (μm) | | YP (MPa) | TS (MPa) | El % | λ % | TS × El (MPa·%) | TS × λ (MPa·%) | ΔTS (MPa) | | | Remarks |
| 1 | A | 84 | 5.2 | 11 | 3.5 | 5 (P) | 475 | 699 | 22.4 | 62 | 15658 | 43338 | 30 | ○ (no uncoated portion) | ○ (no unevenly alloyed portion) | Comparative example |
| 2 | B | 69 | 4.5 | 27 | 3.1 | 4 (P, B) | 567 | 867 | 19.6 | 52 | 16993 | 45084 | 36 | ○ (no uncoated portion) | ○ (no unevenly alloyed portion) | Example |
| 3 | C | 62 | 3.5 | 34 | 2.3 | 4 (P, B) | 604 | 941 | 19.0 | 48 | 17879 | 45168 | 38 | ○ (no uncoated portion) | ○ (no unevenly alloyed portion) | Example |
| 4 | D | 61 | 3.1 | 37 | 1.8 | 2 (P, B) | 627 | 984 | 15.7 | 45 | 15449 | 44280 | 40 | ○ (no uncoated portion) | ○ (no unevenly alloyed portion) | Example |
| 5 | E | 59 | 3.1 | 40 | 1.6 | 1 (P, B) | 635 | 1004 | 15.3 | 43 | 15361 | 43172 | 41 | ○ (no uncoated portion) | ○ (no unevenly alloyed portion) | Example |
| 6 | F | 60 | 3.3 | 39 | 1.8 | 1 (P, B) | 630 | 993 | 15.6 | 44 | 15491 | 43692 | 40 | ○ (no uncoated portion) | ○ (no unevenly alloyed portion) | Example |
| 7 | G | 56 | 3.2 | 42 | 1.9 | 2 (P, B) | 645 | 1025 | 15.0 | 42 | 15375 | 43050 | 41 | ○ (no uncoated portion) | ○ (no unevenly alloyed portion) | Example |
| 8 | H | 53 | 4.1 | 45 | 2.5 | 2 (P, B) | 660 | 1057 | 14.3 | 41 | 15115 | 43337 | 42 | ○ (no uncoated portion) | ○ (no unevenly alloyed portion) | Example |
| 9 | I | 49 | 4.5 | 49 | 2.9 | 2 (P, B) | 679 | 1099 | 13.8 | 40 | 15166 | 43960 | 44 | ○ (no uncoated portion) | ○ (no unevenly alloyed portion) | Example |
| 10 | J | 51 | 3.8 | 46 | 2.6 | 3 (P, B) | 665 | 1067 | 15.1 | 36 | 16112 | 38412 | 43 | ○ (no uncoated portion) | ○ (no unevenly alloyed portion) | Comparative example |
| 11 | K | 43 | 4.7 | 54 | 3.4 | 3 (B, γ) | 703 | 1151 | 9.8 | 39 | 11280 | 44889 | 46 | ○ (no uncoated portion) | ○ (no unevenly alloyed portion) | Comparative example |
| 12 | L | 36 | 7.8 | 63 | 5.5 | 1 (γ) | 743 | 1246 | 10.9 | 30 | 13581 | 37380 | 49 | ○ (no uncoated portion) | ○ (no unevenly alloyed portion) | Comparative example |

*P: pearlite,
B: bainite,
γ: retained austenite (retained γ)

As listed in Table 3, the steel sheets 2 to 9 are steel sheets of examples in which the component compositions and the production method comply with the present invention, the steel sheets satisfying TS≥780 MPa or more (preferably TS≥980 MPa), TS×El≥15,000 MPa·%, and TS×λ≥40,000 MPa·%. Furthermore, variations in tensile strength (TS), i.e., ΔTS, serving as an index of uniformity in material properties in the longitudinal direction of a coil is 50 MPa or lower. This indicates that the steel sheets have good uniformity in material properties in the longitudinal direction of the coils.

that the effect of reducing the difference in hardness between the martensite phase and the ferrite phase is low. Accordingly, TS×λ≥40,000 MPa·% is not achieved. In steel sheet 11 of a comparative example, the Nb content and the Ti content are outside the ranges of the present invention, thus significantly reducing the ductility of ferrite. Accordingly, TS×El≥15,000 MPa·% is not achieved. In steel sheet 12 of a comparative example, the C content, the Si content, and the Mn content are outside the ranges of the present invention. This leads to the formation of an excessively large amount of martensite, thereby reducing El and λ. Accordingly, TS×El≥15,000 MPa·% or TS×λ≥40,000 MPa·% is not achieved.

EXAMPLE 2

Molten steels having compositions of steels B, F, and G listed in Table 1 were produced in a steel making converter and formed into slabs. The slabs were each subjected to hot rolling, cold rolling, primary annealing, pickling, and secondary annealing under conditions listed in Table 4 to produce 1.2-mm-thick high-strength galvanized steel sheets and galvannealed steel sheets (product sheets). The steel sheets that had been subjected to galvanizing treatment were adjusted in such a manner that the coating weight was 50 g/m² per side (coating on both sides). When the alloying treatment was performed, the Fe content of the coated layer was adjusted to 9% to 12%.

TABLE 4

| Steel sheet No. | Steel No. | Hot rolling step | | | Cold rolling step Rolling reduction (%) | Primary annealing step | | | | | Pickling step*4 |
|---|---|---|---|---|---|---|---|---|---|---|---|
| | | Slab heating temperature (° C.) | Finish temperature (° C.) | Average cooling rate (° C./sec)*1 | Coiling temperature (° C.) | | Average heating rate from 650° C. to 750° C. (° C./sec) | Annealing temperature (° C.) | Holding time at annealing temperature (second) | Average cooling rate (° C./sec)*2 | Total area proportion of hard phase (%)*3 | Pickling weight loss (g/m²) |
| 13 | B | 1220 | 890 | 50 | 550 | 50 | 1 | 820 | 100 | 5 | 29 | 0.5 |
| 14 | B | 1220 | 890 | 50 | 620 | 60 | 1 | 780 | 10 | 1 | 30 | 0.5 |
| 15 | B | 1220 | 890 | 50 | 480 | 60 | 1 | 780 | 300 | 5 | 31 | 0.5 |
| 16 | B | 1220 | 890 | 50 | 550 | 60 | 1 | 820 | 100 | 5 | 30 | 0.01 |
| 17 | B | 1220 | 890 | 50 | 550 | 60 | 1 | 820 | 100 | 5 | 31 | 7 |
| 18 | F | 1220 | 890 | 50 | 550 | 50 | 1 | 820 | 100 | 5 | 41 | 0.5 |
| 19 | F | 1220 | 890 | 50 | 550 | 50 | 2 | 820 | 100 | 5 | 40 | 0.5 |
| 20 | F | 1220 | 890 | 3 | 550 | 30 | 1 | 820 | 100 | 5 | 40 | 0.5 |
| 21 | F | 1220 | 820 | 50 | 430 | 50 | 1 | 820 | 100 | 5 | 42 | 0.5 |
| 22 | F | 1220 | 890 | 50 | 680 | 50 | 1 | 820 | 100 | 5 | 39 | 0.5 |
| 23 | G | 1220 | 890 | 50 | 550 | 50 | 1 | 820 | 100 | 5 | 44 | 0.5 |
| 24 | G | 1220 | 890 | 100 | 500 | 40 | 1 | 840 | 100 | 3 | 41 | 0.5 |
| 25 | G | 1220 | 890 | 100 | 500 | 40 | 1 | 840 | 100 | 0.5 | 18 | 0.5 |
| 26 | G | 1220 | 890 | 100 | 500 | 40 | 0.03 | 880 | 600 | 30 | 63 | 0.5 |
| 27 | G | 1220 | 890 | 100 | 500 | 40 | 1 | 840 | 100 | 3 | 40 | 0.5 |
| 28 | G | 1220 | 890 | 100 | 500 | 40 | 5 | 730 | 5 | 3 | 15 | 0.5 |
| 29 | G | 1220 | 890 | 100 | 500 | 40 | 1 | 750 | 10 | 3 | 15 | 0.5 |

| Steel sheet No. | Secondary annealing step | | | | Temper rolling step Elongation percentage (%) | Remarks |
|---|---|---|---|---|---|---|
| | Annealing temperature (° C.) | Holding time at annealing temperature (second) | Primary cooling rate (° C./sec)*5 | Alloying condition | Secondary cooling rate (° C./sec)*6 | |
| 13 | 800 | 100 | 3 | 520° C. × 20 sec. | 15 | 0.3 | galvannealed steel sheet |
| 14 | 780 | 50 | 1 | — | 15 | 0.3 | galvanized steel sheet |
| 15 | 780 | 50 | 10 | — | 15 | 0.3 | galvanized steel sheet |
| 16 | 800 | 100 | 3 | 520° C. × 20 sec. | 15 | 0.3 | galvannealed steel sheet |
| 17 | 800 | 100 | 3 | 520° C. × 20 sec. | 15 | 0.3 | galvannealed steel sheet |
| 18 | 800 | 100 | 3 | 520° C. × 20 sec. | 15 | 0.3 | galvannealed steel sheet |
| 19 | 820 | 100 | 10 | 520° C. × 20 sec. | 50 | 0.3 | galvannealed steel sheet |
| 20 | 800 | 100 | 3 | 520° C. × 20 sec. | 15 | 0.3 | galvannealed steel sheet |
| 21 | 800 | 100 | 3 | 520° C. × 20 sec. | 15 | 0.3 | galvannealed steel sheet |
| 22 | 800 | 100 | 3 | 520° C. × 20 sec. | 15 | 0.3 | galvannealed steel sheet |
| 23 | 800 | 100 | 3 | 520° C. × 20 sec. | 15 | 0.3 | galvannealed steel sheet |
| 24 | 820 | 100 | 10 | 520° C. × 20 sec. | 15 | 0.3 | galvannealed steel sheet |
| 25 | 820 | 100 | 0.5 | 520° C. × 20 sec. | 3 | 0.3 | galvannealed steel sheet |
| 26 | 820 | 100 | 30 | 520° C. × 20 sec. | 150 | 0.3 | galvannealed steel sheet |
| 27 | 880 | 600 | 3 | 520° C. × 20 sec. | 5 | 0.3 | galvannealed steel sheet |
| 28 | 720 | 5 | 3 | 520° C. × 20 sec. | 5 | 0.3 | galvannealed steel sheet |
| 29 | 800 | 100 | 3 | 520° C. × 20 sec. | 15 | 0.3 | galvannealed steel sheet |

*1: Average cooling rate from the finish temperature to (the finish temperature −100° C.).
*2: Average cooling rate from the annealing temperature to a temperature of 600° C. or lower.
*3: Total area proportion of martensite, bainite, pearlite, and retained γ
*4: Pickling with 5% hydrochloric acid at 60° C. for 10 seconds.
*5: Average cooling rate from the annealing temperature to the galvanizing bath temperature.
*6: Average cooling rate to a temperature of 150° C. or lower after the galvanizing treatment or alloying treatment for the coated layer.

As with Example 1, each of the resulting high-strength steel sheets (product sheets) was analyzed for identification of the microstructure, measurement of the area proportions of the ferrite phase and the martensite phase, the average grain sizes of ferrite and martensite, YP, TS, El, and λ, and evaluation of variations in tensile strength (TS), i.e., ΔTS, serving as an index of uniformity in material properties in the longitudinal direction of a coil.

Table 5 lists the results.

TABLE 5

| Steel sheet No. | Steel No. | Ferrite Area proportion (%) | Ferrite Average grain size (μm) | Martensite Area proportion (%) | Martensite Average grain size (μm) | Microstructure of balance* Area proportion (%) | YP (MPa) | TS (MPa) | El % | λ % | TS × El (MPa·%) | TS × λ (MPa·%) | ΔTS (MPa) | Appearance after coating | Appearance after alloying | Remarks |
|---|---|---|---|---|---|---|---|---|---|---|---|---|---|---|---|---|
| 13 | B | 69 | 4.5 | 27 | 3.1 | 4 (P, B) | 567 | 867 | 19.6 | 52 | 16993 | 45084 | 36 | ○ (no uncoated portion) | ○ (no unevenly alloyed portion) | Example |
| 14 | B | 70 | 4.4 | 26 | 3.2 | 4 (P, B) | 560 | 862 | 19.6 | 50 | 16895 | 43100 | 44 | ○ (no uncoated portion) | ○ (no unevenly alloyed portion) | Example |
| 15 | B | 68 | 4.2 | 28 | 3.0 | 4 (P, B) | 569 | 875 | 19.2 | 50 | 16800 | 43750 | 45 | ○ (no uncoated portion) | ○ (no unevenly alloyed portion) | Example |
| 16 | B | 69 | 4.3 | 28 | 3.2 | 3 (P, B) | 571 | 878 | 19.3 | 51 | 16945 | 44778 | 36 | × (uncoated portion observed) | × (unevenly alloyed portion observed) | Comparative example |
| 17 | B | 70 | 4.3 | 26 | 3.0 | 4 (P, B) | 557 | 857 | 19.7 | 51 | 16883 | 43707 | 36 | × (uncoated portion observed) | × (unevenly alloyed portion observed) | Comparative example |
| 18 | F | 60 | 3.3 | 39 | 1.8 | 1 (P, B) | 630 | 993 | 15.6 | 44 | 15491 | 43692 | 40 | ○ (no uncoated portion) | ○ (no unevenly alloyed portion) | Example |
| 19 | F | 56 | 3.2 | 42 | 1.9 | 2 (P, B) | 642 | 1022 | 15.0 | 43 | 15330 | 43946 | 41 | ○ (no uncoated portion) | ○ (no unevenly alloyed portion) | Example |
| 20 | F | 60 | 7.2 | 37 | 5.1 | 3 (P, B) | 626 | 984 | 15.9 | 41 | 15646 | 40344 | 49 | ○ (no uncoated portion) | ○ (no unevenly alloyed portion) | Example |
| 21 | F | 59 | 3.1 | 39 | 1.8 | 2 (P, B) | 632 | 999 | 15.6 | 45 | 15584 | 44955 | 50 | ○ (no uncoated portion) | ○ (no unevenly alloyed portion) | Example |
| 22 | F | 58 | 3.0 | 40 | 1.6 | 2 (P, B) | 635 | 1004 | 15.3 | 40 | 15361 | 40160 | 40 | ○ (no uncoated portion) | ○ (no unevenly alloyed portion) | Example |
| 23 | G | 56 | 3.2 | 42 | 1.9 | 2 (P, B) | 645 | 1025 | 15.0 | 42 | 15375 | 43050 | 41 | ○ (no uncoated portion) | ○ (no unevenly alloyed portion) | Example |
| 24 | G | 59 | 3.1 | 40 | 1.6 | 1 (P, B) | 635 | 1004 | 15.3 | 43 | 15361 | 43172 | 41 | ○ (no uncoated portion) | ○ (no unevenly alloyed portion) | Example |
| 25 | G | 81 | 5.2 | 13 | 3.5 | 6 (P, B) | 510 | 762 | 20.7 | 58 | 15773 | 44196 | 32 | ○ (no uncoated portion) | ○ (no unevenly alloyed portion) | Comparative example |
| 26 | G | 36 | 6.6 | 63 | 5.5 | 1 (P, B) | 743 | 1246 | 10.9 | 31 | 13581 | 38626 | 49 | ○ (no uncoated portion) | ○ (no unevenly alloyed portion) | Comparative example |
| 27 | G | 43 | 10.2 | 54 | 5.9 | 3 (P, B) | 703 | 1151 | 13.1 | 35 | 15078 | 40285 | 46 | × (uncoated portion observed) | × (unevenly alloyed portion observed) | Comparative example |
| 28 | G | 84 | 5.2 | 11 | 3.5 | 5 (P, B) | 475 | 699 | 22.4 | 62 | 15658 | 43338 | 30 | ○ (no uncoated portion) | ○ (no unevenly alloyed portion) | Comparative example |
| 29 | G | 60 | 3.1 | 38 | 1.7 | 2 (P, B) | 619 | 981 | 15.3 | 44 | 15009 | 43164 | 41 | ○ (no uncoated portion) | ○ (no unevenly alloyed portion) | Example |

As listed in Table 5, steel sheets 13 to 15, 18 to 24, and 29 which satisfy the production conditions in the present invention are steel sheets of examples in which the component compositions and the production method comply with the present invention, the steel sheets satisfying TS≥780 MPa (preferably TS≥980 MPa), TS×El≥15,000 MPa·%, and TS×λ≥40,000 MPa·%. Furthermore, variations in tensile strength (TS), i.e., ΔTS, serving as an index of uniformity in material properties in the longitudinal direction of a coil is 50 MPa or lower. This indicates that the steel sheets have good uniformity in material properties in the longitudinal direction of the coils. Moreover, neither an uncoated portion nor an unevenly alloyed portion is formed. This indicates that the steel sheets have good surface properties.

In contrast, in steel sheet 16 of a comparative example, the pickling weight loss in the pickling step is lower than the range of the present invention. Thus, surface segregated compounds of oxidizable elements, such as Si and Mn, formed in the primary annealing are left, thereby forming an uncoated portion and an unevenly alloyed potion. In steel sheet 17 of a comparative example, the pickling weight loss in the pickling step exceeds the upper limit of the range of the present invention. Thus, a surface of the steel sheet is roughened by excessive pickling, thereby forming an uncoated portion and an unevenly alloyed portion. In steel sheet 25 of a comparative example, the secondary cooling rate during the secondary annealing is lower than the range of the present invention. Thus, ferrite formed during the primary cooling, and pearlite or bainite formed during the secondary cooling are increased, thereby failing to obtain a desired amount of martensite after the final (secondary) annealing. Accordingly, TS≥780 MPa is not achieved. In steel sheet 26 of a comparative example, the primary cooling rate and the secondary cooling rate during the secondary annealing exceed the ranges of the present invention, thereby inhibiting the formation of ferrite during the primary cooling to cause excessive formation of a hard phase, such as martensite. Furthermore, martensite formed after the secondary cooling is excessively hard, thereby reducing El and λ. Accordingly, TS×El≥15,000 MPa·% or TS×λ≥40,000 MPa·% is not achieved. In steel sheet 27 of a comparative example, the annealing temperature and the holding time during the secondary (final) annealing exceed the ranges of the present invention. Thus, although Si and Mn have been removed in the pickling step, they are reconcentrated on a surface to form surface segregated compounds that cause the formation of an uncoated portion and an unevenly alloyed portion. In steel sheet 28 of a comparative example, the annealing temperature and the holding time during the secondary annealing are less than the ranges of the present invention. Thus, a desired amount of martensite is not obtained. Accordingly, TS≥780 MPa is not achieved.

INDUSTRIAL APPLICABILITY

Each of the galvanized steel sheet and the galvannealed steel sheet according to the present invention has high tensile strength, good surface properties, and good uniformity in material properties in the longitudinal direction of a coil owing to a small dependence of the material on annealing temperature, contributes greatly to improvement in collision safety and a reduction in weight of automobiles, and should improve workability in press forming. Furthermore, each of the galvanized steel sheet and the galvannealed steel sheet according to the present invention is suitable for automotive parts and as a material for use in the fields of architecture and household electrical appliances.

The invention claimed is:

1. A method for producing a high-strength galvanized steel sheet having a microstructure that contains martensite in an area proportion of 20% or more and 60% or less and ferrite in an area proportion of 40% or more and 80% or less, the method comprising, in sequence, hot-rolling a steel slab containing, on a mass percent basis, 0.05% or more and less than 0.12% of C, 0.01% or more and less than 0.35% of Si, 2.2% or more and 3.5% or less of Mn, 0.001% or more and 0.050% or less of P, 0.010% or less of S, 0.005% or more and 0.100% or less of sol. Al, 0.0001% or more and 0.0060% or less of N, 0.010% or more and 0.080% or less of Nb, 0.010% or more and 0.080% or less of Ti, and the balance being Fe and incidental impurities; performing cold rolling; performing primary annealing; performing pickling; performing secondary annealing; and performing galvanizing treatment, wherein in the primary annealing, heating is performed at an average heating rate of 0.1° C./sec. or more and less than 3° C./sec. in the temperature range of 600° C. to 750° C., an annealing temperature of 750° C. to 850° C. is maintained for 10 to 500 seconds, and then cooling is performed from the annealing temperature range to a cooling stop temperature of 600° C. or lower at an average cooling rate of 1 to 15° C./sec, wherein in the pickling, the pickling weight loss of a steel sheet is 0.05 to 5 g/m² in terms of Fe, wherein in the secondary annealing, an annealing temperature of 750° C. to 850° C. is maintained for 10 to 500 seconds, and then cooling is performed from the annealing temperature at an average cooling rate of 1 to 15° C./sec, and wherein after the galvanizing treatment, cooling is performed at an average cooling rate of 5 to 100° C./sec.

2. The method for producing a high-strength galvanized steel sheet according to claim 1, wherein cooling is started within 3 seconds after the completion of finish rolling in the hot rolling, the cooling is performed in the temperature range of a finish rolling temperature in the hot rolling to (the finish rolling temperature—100° C.) at an average cooling rate of 5 to 200° C./sec, coiling is performed at 450° C. to 650° C., and then the cold rolling is performed at a rolling reduction of 40% or more.

3. A method for producing a high-strength galvannealed steel sheet having a microstructure that contains martensite in an area proportion of 20% or more and 60% or less and ferrite in an area proportion of 40% or more and 80% or less, the method comprising, after the galvanizing treatment in the method for producing a high-strength galvanized steel sheet according to claims 1, performing alloying treatment, and then performing cooling at average cooling rate of 5 to 100° C./sec.

4. The method for producing a high-strength galvanized steel sheet according to claim 1, wherein the high-strength galvanized steel sheet further contains, on a mass percent basis, one or more selected from 0.05% or more and 1.0% or less of Mo, 0,02° or more and 0.50% or less of V, 0.05% or more and 1.0% or less of Cr, and 0.0001% or more and 0,0030% or less of B in addition to the foregoing component composition.

5. The method for producing a high-strength galvanized steel sheet according to claim 4, wherein cooling is started within 3 seconds after the completion of finish rolling in the hot rolling, the cooling is performed in the temperature range of a finish rolling temperature in the hot rolling to (the finish rolling temperature—100° C.) at an average cooling rate of 5 to 200 °C./sec, coiling is performed at 450° C. to 650° C., and then the cold rolling is performed at a rolling reduction of 40% or more.

6. A method for producing a high-strength galvannealed steel sheet having a microstructure that contains martensite in an area proportion of 20% or more and 60% or less and ferrite in an area proportion of 40% or more and 80% or less, the method comprising, after the galvanizing treatment in the method for producing a high-strength galvanized steel sheet according to claim 4, performing alloying treatment, and then performing cooling at average cooling rate of 5 to 100° C./sec.

* * * * *

UNITED STATES PATENT AND TRADEMARK OFFICE
CERTIFICATE OF CORRECTION

| | | |
|---|---|---|
| PATENT NO. | : 10,294,542 B2 | Page 1 of 1 |
| APPLICATION NO. | : 15/305557 | |
| DATED | : May 21, 2019 | |
| INVENTOR(S) | : Hideyuki Kimura et al. | |

It is certified that error appears in the above-identified patent and that said Letters Patent is hereby corrected as shown below:

In the Claims

At Column 26, Line 51, in Claim 3, "according to claims 1," should read --according to claim 1,--.

At Column 26, Line 58, in Claim 4, "0,02° or more" should read --0.02% or more--.

At Column 26, Line 60, in Claim 4, "0,0030% or less" should read --0.0030% or less--.

Signed and Sealed this
Sixteenth Day of July, 2019

Andrei Iancu
*Director of the United States Patent and Trademark Office*